(12) United States Patent
Spahr et al.

(10) Patent No.: US 10,520,393 B2
(45) Date of Patent: Dec. 31, 2019

(54) SYSTEM AND METHOD FOR VERIFYING A DIOPTER SETTING AND RANGE OF AN OPTICAL SYSTEM EYEPIECE

(71) Applicant: BAE Systems Information and Electronic Systems Integration Inc., Nashua, NH (US)

(72) Inventors: Erik J. Spahr, Hollis, NH (US); David L. Masters, Tyngsboro, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 129 days.

(21) Appl. No.: 15/767,536

(22) PCT Filed: Aug. 10, 2017

(86) PCT No.: PCT/US2017/046205
§ 371 (c)(1),
(2) Date: Apr. 11, 2018

(87) PCT Pub. No.: WO2019/032109
PCT Pub. Date: Feb. 14, 2019

(65) Prior Publication Data
US 2019/0368969 A1    Dec. 5, 2019

(51) Int. Cl.
*G01M 11/02*    (2006.01)

(52) U.S. Cl.
CPC .... *G01M 11/0228* (2013.01); *G01M 11/0264* (2013.01)

(58) Field of Classification Search
CPC ......... G01M 11/0228; G01M 11/0264; G01M 11/0285; G01M 11/0214; G02C 13/003
USPC .............................. 356/124–125, 127
See application file for complete search history.

(56) References Cited

U.S. PATENT DOCUMENTS

| | | | |
|---|---|---|---|
| 4,372,655 A * | 2/1983 | Matsumura | A61B 3/103 351/206 |
| 5,123,735 A * | 6/1992 | Hegarty | G01M 11/0228 356/125 |
| 5,307,141 A | 4/1994 | Fujieda | |
| 5,331,394 A | 7/1994 | Shalon et al. | |
| 5,684,561 A * | 11/1997 | Yancey | A61B 3/103 351/209 |
| 5,737,012 A * | 4/1998 | Tabata | G02B 27/017 348/53 |
| 5,914,772 A * | 6/1999 | Dyer | A61B 3/028 351/222 |
| 10,036,685 B2 * | 7/2018 | Goldberg | G01M 11/0235 |
| 2015/0300912 A1 | 10/2015 | Allione | |

(Continued)

OTHER PUBLICATIONS

International Search Report, PCT/US17/46205, dated Jan. 17, 2018, 9 pages.

*Primary Examiner* — Isiaka O Akanbi
(74) *Attorney, Agent, or Firm* — Scott J. Asmus; Sand, Sebolt & Wernow LPA (57) ABSTRACT

The present disclosure relates to a system and method for verifying a diopter setting and range of an optical system eyepiece by utilizing an image sensor to view and analyze test patterns of spots displayed within the optical system eyepiece and calculating the diopter setting and range of the optical system eyepiece from an observed change in the test pattern at different diopter settings.

20 Claims, 6 Drawing Sheets

(56) References Cited

U.S. PATENT DOCUMENTS

2016/0249804 A1 9/2016 Wang
2018/0038768 A1* 2/2018 Hofmann ........... G01M 11/0228

* cited by examiner

SYSTEM AND METHOD FOR VERIFYING A DIOPTER SETTING AND RANGE OF AN OPTICAL SYSTEM EYEPIECE

STATEMENT OF GOVERNMENT INTEREST

This present disclosure was made with United States Government support under Contract No. W91CRB-14-D-0010 awarded by the United States Army. The United States Government has certain rights in this invention.

BACKGROUND

Technical Field

The present disclosure relates generally to a system and method for verifying a diopter setting and range of an optical system eyepiece. More particularly, the present disclosure relates to a system and method for verifying a diopter setting and range of an optical system eyepiece by viewing and analyzing test patterns displayed within the optical system eyepiece. Specifically, the present disclosure relates to utilizing an image sensor to view and analyze test patterns of spots displayed within the optical system eyepiece and calculating the diopter setting and range of the optical system eyepiece from an observed change in the test pattern at different diopter settings.

Background Information

Generally, a diopter is a unit of measurement of the optical power of a lens or curved mirror, which is equal to the reciprocal of the focal length measured in meters (that is, 1/meters). Therefore, a diopter is a unit of reciprocal length.

A diopter setting of an optical eyepiece system is representative of the optical system eyepiece focus which is the reciprocal of the image distance. Typically, optical system eyepieces are focused, at least in part, by adjusting the diopter of the optical system eyepiece. The diopter of optical system eyepieces is typically adjusted by rotating a diopter adjustment mechanism. Adjusting the diopter adapts the optical system eyepiece to an operator's eyes.

Generally, optical system eyepieces are configured to have a particular diopter setting or diopter requirement. A typical diopter setting or diopter requirement for an optical system eyepiece is a zero diopter which may be adjusted between a range of diopter settings. Typically, it is desirable to be able to measure and/or verify that the particular diopter setting or requirement is accurate in a variety of test and maintenance scenarios.

One typical method of measuring and/or verifying the diopter setting or requirement of an optical system eyepiece involves utilizing a dioptometer which is an expensive precision optical device used by an operator to determine the diopter setting of an optical system eyepiece. Typically, the dioptometer is set at a zero diopter setting and is used to check the accuracy of a zero diopter setting in the optical system eyepiece under testing. In addition to being expensive, the dioptometer must be operated by a human which involves subjectivity and may lead to errors.

SUMMARY

Therefore, there is need for a system and method for verifying a diopter setting of an optical system eyepiece which is low in cost and which provides accurate results with minimal need for human subjectivity.

In one aspect, the present disclosure may provide a system for verifying a diopter setting and range of an optical system eyepiece comprising an image sensor having a lens and a non-transitory computer-readable storage medium having instructions encoded thereon that, when executed by one or more processors, result in the following operations for verifying a diopter setting and range of an optical system eyepiece: displaying a pattern of spots on a display apparatus of the optical system; creating at least one first image with the image sensor of the pattern of spots displayed on the display apparatus of the system at a zero diopter setting; creating at least one second image with the image sensor of the pattern of spots displayed on the display apparatus of the system at a first non-zero diopter setting; comparing the at least one first image to the at least one second image; processing a calculated diopter setting and a calculated range; and verifying an actual diopter setting and an actual range of the optical system eyepiece are within a predetermined range.

In another aspect, the present disclosure may provide a method for verifying a diopter setting and range of an optical system eyepiece comprising providing an image sensor having at least one lens; displaying a pattern of spots on a display apparatus of the optical system; creating at least one first image with the image sensor of the pattern of spots displayed on the display apparatus of the system at a zero diopter setting; creating at least one second image with the image sensor of the pattern of spots displayed on the display apparatus of the system at a first non-zero diopter setting; comparing the at least one first image to the at least one second image; processing a calculated diopter setting and a calculated range; and verifying an actual diopter setting and an actual range of the optical system eyepiece are within a predetermined range.

In another aspect, the present disclosure may provide a system and method for verifying a diopter setting and range of an optical system eyepiece by utilizing an image sensor to view and analyze test patterns of spots displayed within the optical system eyepiece and calculating the diopter setting and range of the optical system eyepiece from an observed change in the test pattern at different diopter settings.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

Similar numbers refer to similar parts throughout the drawings.

DETAILED DESCRIPTION

The present disclosure relates to a system and method for verifying a diopter setting and range of an optical system eyepiece.

Figure 1:
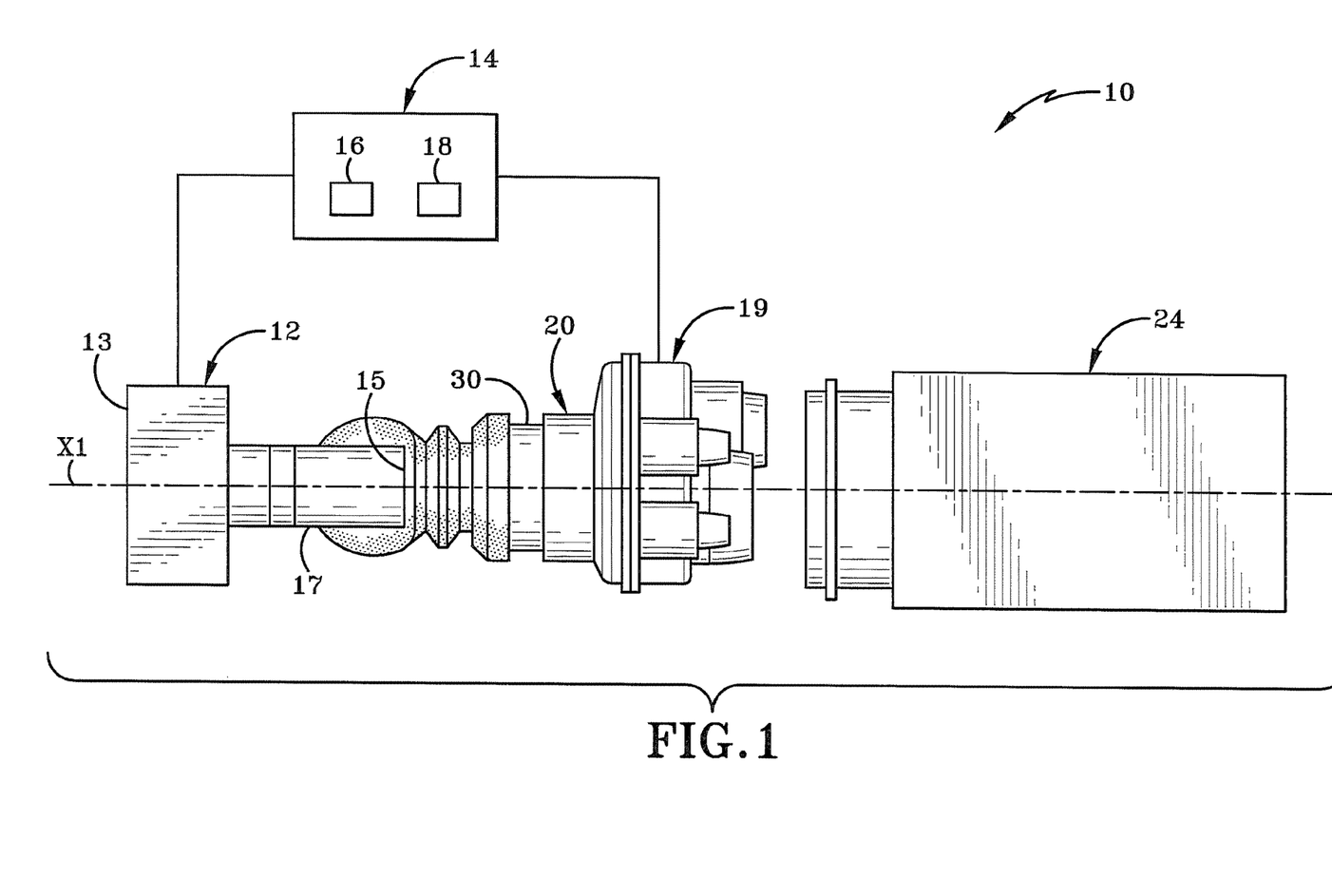
FIG. 1 is a diagrammatical view of a diopter setting verification system.
Figure 2A:
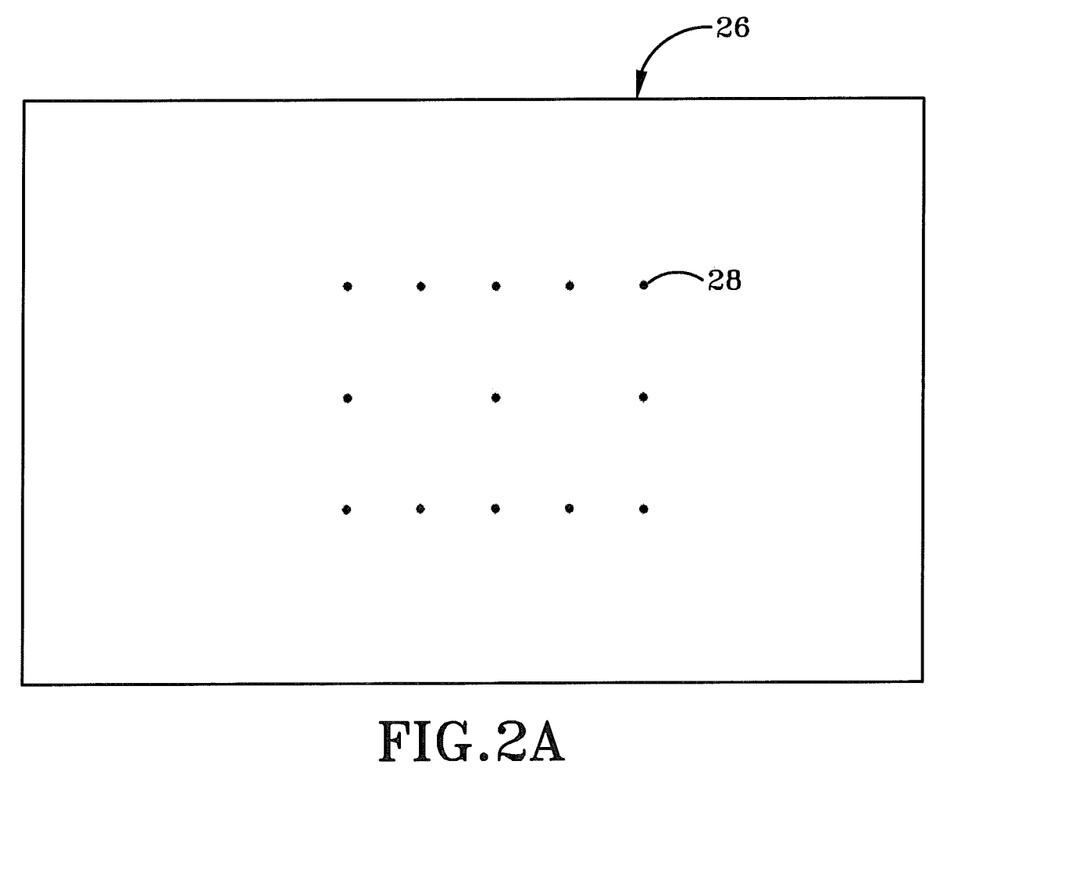
FIG. 2A is an image of an optical system eyepiece display at a zero diopter setting.
Figure 2B:
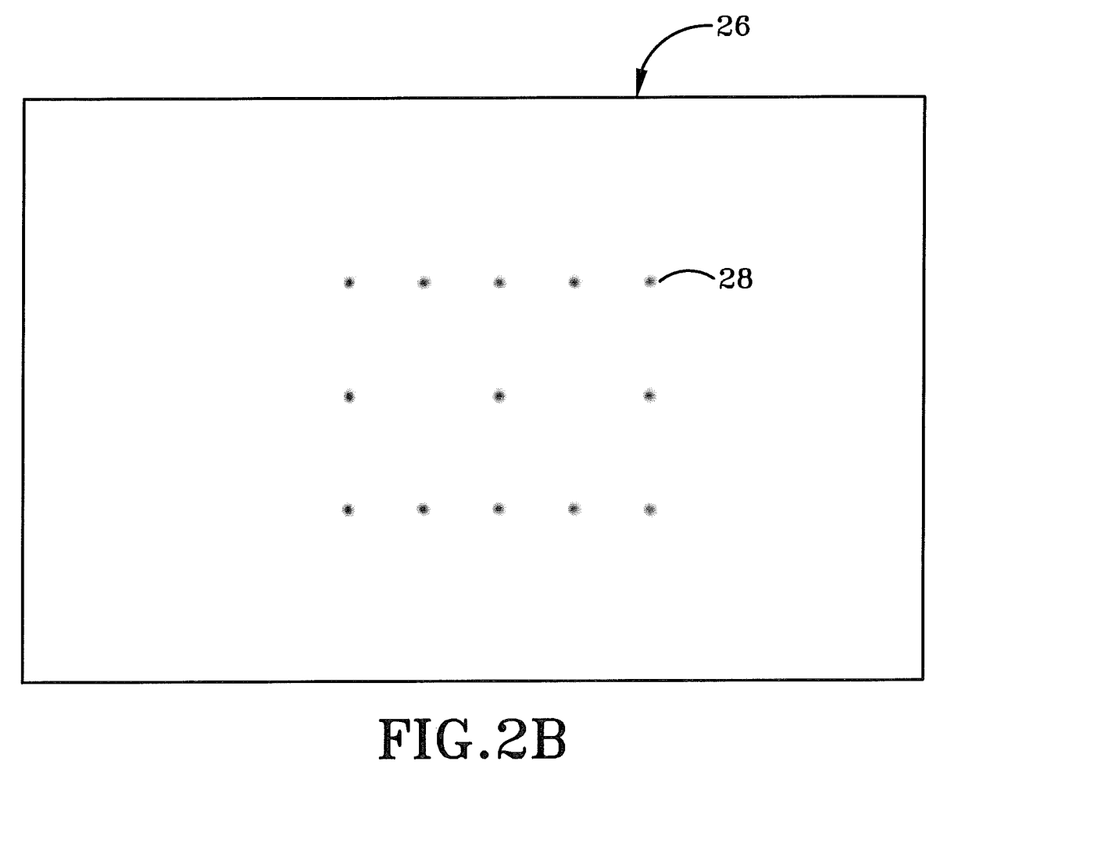
FIG. 2B is an image of the optical system eyepiece display at a minimum diopter setting.
Figure 2C:
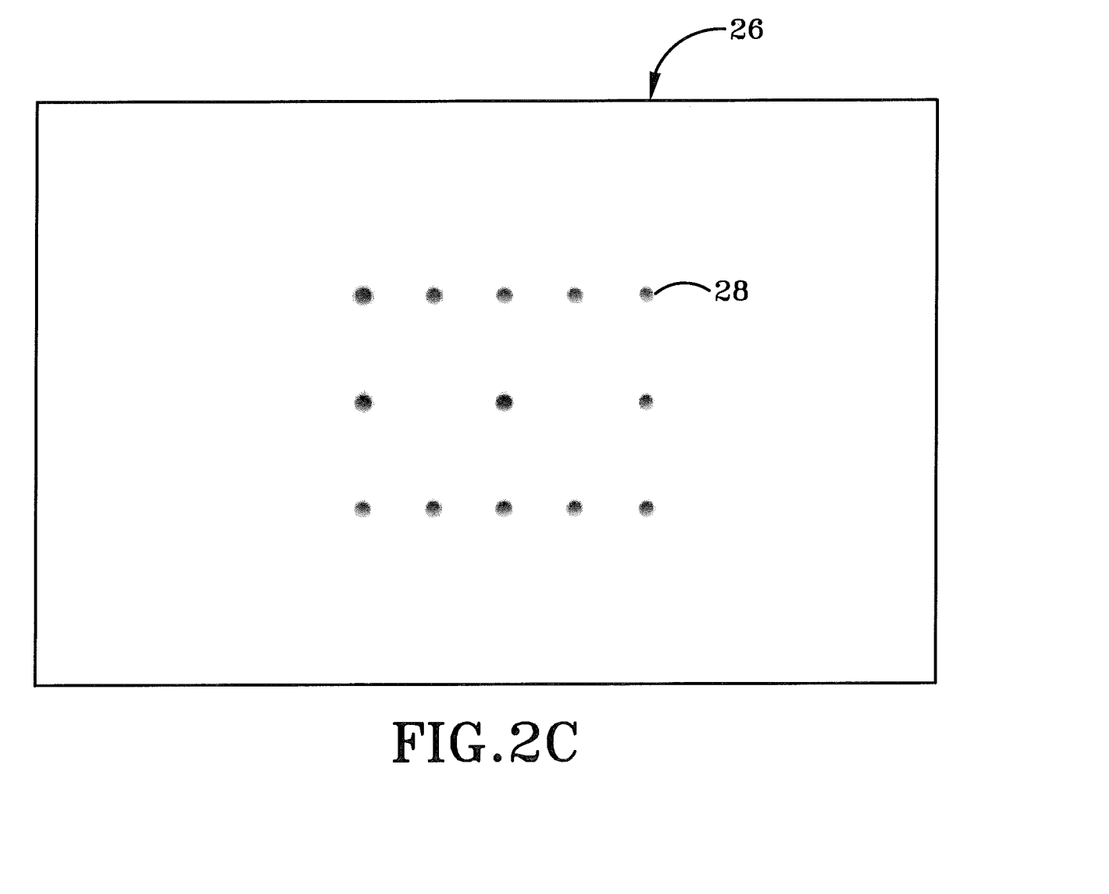
FIG. 2C is an image of the optical system eyepiece display at a maximum non-zero diopter setting.

FIG. 1-FIG. 2C depicts a diopter setting and range verification system 10 comprising an image sensor 12, a computer 14 having a non-transitory computer readable storage medium 16 with instructions encoded thereon for execution in one or more processors 18, an optical system 19, an optical system eyepiece 20, a display apparatus (not shown), a focusing device 24 and a test pattern 26 having at least two spots 28.

As shown in FIG. 1, the image sensor 12 includes a first end 13 and a second end 15 defining a longitudinal direction therebetween. The image sensor defines an optical axis X1 which extends longitudinally through a center of a lens 17 of the image sensor 12 towards the optical system eyepiece 20 as shown in FIG. 1. In one example, the image sensor 12 may be placed in front of the optical system eyepiece as shown in FIG. 1.

In one example, the image sensor 12 may be a digital camera having a pixel size of 0.0024 mm and a lens 17 focal length of 12.0 mm. As such, the image sensor 12 has an instantaneous field of view (IFOV), defined as the pixel size over the focal length of the image sensor 12 lens 17, of 0.200 milliradians (mRad). An exemplary image sensor 12 may be a digital camera having model number PL-D729 which is commercially available from PIXELINK of Ottawa, Ontario; however any suitable image sensor 12 may be utilized.

FIG. 1 discloses a first exemplary embodiment of the optical system 19 as a night vision goggle having an optical system eyepiece 20. In one example, the night vision goggle may include a diopter adjustment mechanism 30. The diopter adjustment mechanism 30 may be rotated to adjust the diopter of the night vision goggle to various settings. It is to be understood that the diopter adjustment mechanism 30 may be adjusted in any suitable manner. For example, the diopter adjustment mechanism 30 may be adjusted manually by an operator or may be automatically adjusted by a processor 18 or the like. In one example, the optical system eyepiece 20 may be adjusted between a range of −2 diopters to +6 diopters which includes a diopter setting of zero. In one example, the −2 diopter setting may be referred to as a minimum diopter setting and the +6 diopter setting may be referred to as a maximum diopter setting; however, the optical system eyepiece 20 may have any suitable range of diopter settings.

The minimum diopter setting and the maximum diopter setting may also be referred to as a first and second non-zero diopter setting. For example, in the event the optical system eyepiece 20 has a diopter setting of zero with a range from −2 diopter to +6 diopter, the −2 diopter may be referred to as the first non-zero diopter setting and/or the minimum diopter setting and the +6 diopter setting may be referred to as the second non-zero diopter setting and/or the maximum diopter setting. In the event the optical system eyepiece 20 has a diopter setting of zero with a range from −2 diopter to the zero diopter, the −2 diopter may be referred to as the first non-zero diopter setting and/or the minimum diopter setting. In the event the optical system eyepiece 20 has a diopter setting of zero with a range from +6 diopter to the zero diopter, the +6 diopter may be referred to as the first non-zero diopter setting and/or the maximum diopter setting. It is to be understood that the first and second non-zero diopter setting may be any suitable diopter setting of the optical system eyepiece 20.

In one example, the IFOV of the optical system eyepiece 20 is 0.376 mRad. Although the image sensor 12 pixel size has been described as being 0.0024 mm and the lens 17 focal length being 12.0 mm, the pixel size and the lens 17 focal length may be any suitable size and length respectively; however, in one example, the ratio of the IFOV of the image sensor 12 and the optical system eyepiece 20 must be at least 1.8.

In one example, the display apparatus of the optical system eyepiece 20 may be a light emitting diode micro-display housed within the optical system 19 in any suitable manner; however, any suitable display apparatus may be utilized and the display apparatus may be operably engaged with the optical system 19 in any suitable manner.

In one example, the focusing device 24 may be an off-axis parabola (OAP) collimating mirror with a visible edge or bar target placed at the focus of the OAP collimating mirror provided within a housing or other enclosing; however, the focusing device may be any suitable focusing device.

In one example, and as shown in FIG. 2A, the test pattern 26 may be a thirteen point grid. In one example, one spot 28 must be centrally located on the optical axis X1 and the other spots 28 must be positioned a distance away from the spot 28 that is centrally located on the optical axis X1. In one example, the off-axis distance of the peripheral spots 28 should be at least approximately fifteen percent of the field of view of the optical system eyepiece 20 micro-display. Further, each spot 28 should be at least five image sensor 12 pixels in diameter, and the spots 28 in FIG. 2A are each thirty image sensor 12 pixels in diameter.

In one exemplary operation, an operator, or the at least one processor 18, focuses the image sensor 12 lens 17 at infinity. This could be accomplished by utilizing the OAP collimating mirror with a visible edge at the OAP collimating mirror's focus in combination with an automated edge detection algorithm to determine the infinity focus as one of ordinary skill in the art would understand. It is to be understood that any suitable method may be utilized to focus the image sensor 12 lens 17 at infinity.

As shown in FIG. 1, the image sensor 12 with lens 17 is placed in front of the optical system eyepiece 20 aligned with the optical axis X1. Next, the test pattern 26 of spots 28 is displayed on the optical system eyepiece 20 display apparatus. Then, the image sensor 12 views the test pattern 26 having the spots 28 displayed on the display apparatus. The diopter setting of the optical system eyepiece 20 is set to zero. At least one first image of the test pattern 26 of spots 28 at the zero diopter setting is created with the image sensor 12. An exemplary image is shown in FIG. 2A. The at least one first image is saved to the storage medium 16 in any suitable manner, such as by transferring data through a flash drive. The at least one first image provides the reference spot 28 positions which may be used to measure a spot translation at non-zero diopter settings as further described below.

Next, the diopter setting of the optical system eyepiece 20 is set to a first non-zero diopter setting. In one example, the first non-zero diopter setting may be the minimum diopter setting of the optical system eyepiece 20. Next, at least one second image of the test pattern 26 of spots 28 at the first non-zero diopter setting is created with the image sensor 12. An exemplary image is shown in FIG. 2B. The at least one second image is saved to the storage medium 16 in any suitable manner.

Next, the diopter setting of the optical system eyepiece 20 is set to a second non-zero diopter setting. In one example, the second non-zero diopter setting may be the maximum diopter setting of the optical system eyepiece 20. Next, at least one third image of the test pattern 26 of spots 28 at the second non-zero diopter setting is created with the image sensor 12. An exemplary image is shown in FIG. 2C. The at least one third image is saved to the storage medium 16 in any suitable manner.

Next, the at least one first image is compared to the at least one second image and the at least one third image. In one example, the diopter setting and range of the optical system eyepiece 20 are calculated based upon the comparison of the at least one first image to the at least one second image and the at least one third image as further described below.

In one example, the difference between a centroid location (i.e. center) of the spots 28 of the images taken at the first and second non-zero diopter settings and the spots of the images taken at the zero diopter setting may be used to calculate the focus error from the diopter setting. The focus error is defined as the distance along the optical axis separating the ideal focus location from that of the current diopter setting.

In one example, the focus error is calculated as follows:

(a) calculate the centroids of the reference spots (Cent_Ref) in the at least one first image of the test pattern 26 of spots 28 at the zero diopter setting as one of ordinary skill in the art would understand;

(b) calculate the centroids of spots 28 (Cent_spot) in the at least one second image of the test pattern 26 of spots 28 at the first non-zero diopter setting as one of ordinary skill in the art would understand;

(c) calculate the spot translation (Spot_trans) on the image sensor 12 as the difference in centroid location of the spots 28 from each of the at least one first image and the at least one second image given by:

$$\text{Spot\_trans} = \text{Cent\_spot} - \text{Cent\_Ref} \quad \text{(Equation 1)};$$

(d) calculate the spot ray angle from the test pattern's 26 center spot 28 centroid (Cent_center) measured on the image sensor 12 given by:

$$\text{Spot\_Pos} = (\text{Cent\_spot} - \text{Cent\_center}) * PL\_pix \quad \text{(Equation 2)}$$

where Spot_Pos is spot 28 position and PL_pix is the image sensor 12 pixel size, and $$\text{Ray\_Ang} = \text{ATAN}(\text{Spot\_Pos}/fcam) \quad \text{(Equation 3)}$$

where Ray_Ang is spot 28 center ray angle and fcam is the focal length of the image sensor 12 lens 17;

(e) calculate the focus error ($\Delta f$) on the image sensor 12 produced by the diopter setting using Spot_trans and the Ray_Ang calculated above given by:

$$\Delta f = \text{Spot\_trans}/\text{TAN}(\text{Ray\_Ang}) \quad \text{(Equation 4)}$$

where Spot_trans is spot translation. (Note: TAN(Ray_Ang) = Spot_trans/$\Delta f$);

(f) calculate the actual image distance on the image sensor 12 produced by the diopter setting of the optical system eyepiece 20 given by:

$$Si = f + \Delta f \quad \text{(Equation 5)}$$

where Si is image distance and f is focal length;

(g) calculate the diopter setting and range of the optical system eyepiece 20 using the simple lens equation and lens diopter equation given by:

$$D = 0.5 * Ro = (1/f - 1/Si)/2 \quad \text{(Equation 6)}$$

where D is diopter and Ro is radius of curvature of the optical system eyepiece 20 lens and where $$1/So = 1/f - 1/Si = 1/Ro \quad \text{(Equation 7)}$$

where So is object distance.

In one example, the diopter D may be calculated for any diopter setting of the optical system eyepiece 20 including, but not limited to, the zero diopter setting, the minimum diopter setting, the maximum diopter setting or any other suitable diopter setting. In one example, after the diopter setting and range are calculated based on the comparison of the at least one first image and the at least one second image, the diopter setting and range of the optical system eyepiece 20 may be verified. In other words, a calculated diopter setting and a calculated range may be processed and an actual diopter setting and an actual range may be verified to be within a predetermined range. It is to be understood that that predetermined range may be any suitable predetermined range.

The same calculations may also be performed comparing the at least one first image to the at least one third image of the test pattern 26 of spots 28 at the second non-zero diopter setting. In one example, the optical system eyepiece being tested may only have one non-zero diopter setting. In this case, only one set of calculations may be performed. In another example, the optical system eyepiece 20 being tested may have at least two non-zero diopter settings, and two sets of calculations may be performed.

Figure 3:
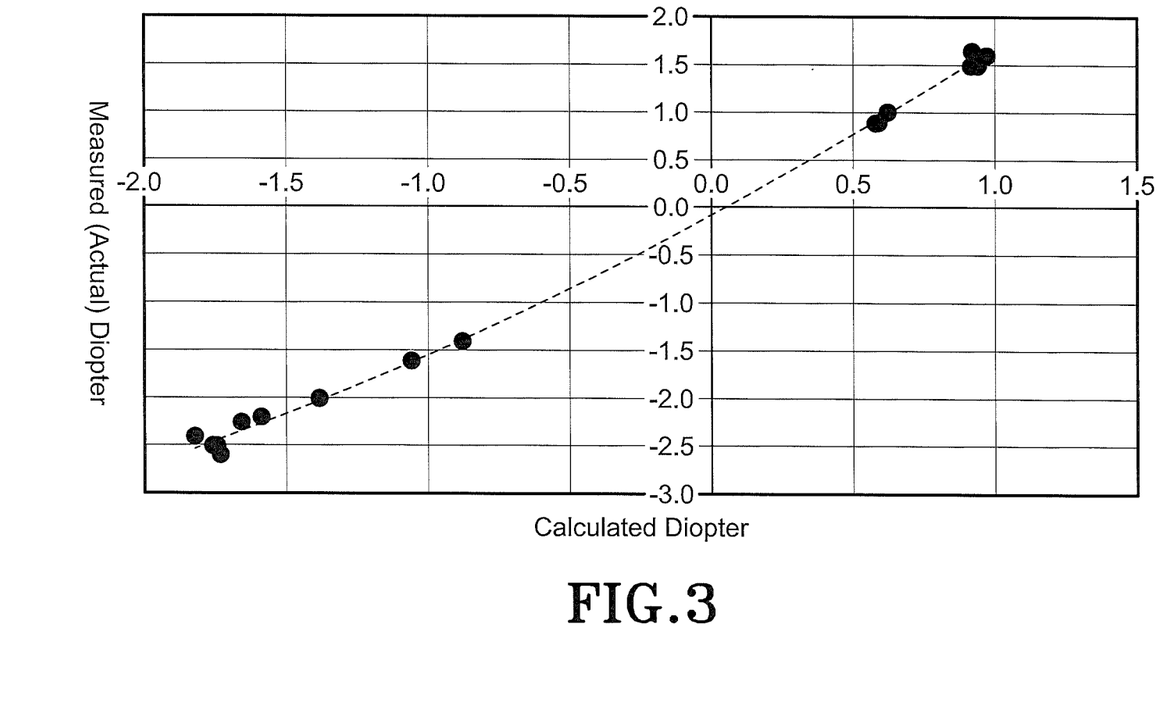
FIG. 3 is a graph of measured diopter versus calculated diopter.

In one example, any additional error may be corrected by calculating a one-time offset from multiple diopter measurements taken by a trained operator and a calibrated dioptometer. The actual and computational values are then compared and fit to a 3rd order polynomial calibration equation, such as $y = 0.1497x^2 + 1.6158x - 0.0741$. Using these calibration coefficients, the diopter setting and range may be accurately determined using the above computational approach. An exemplary graph of the calculations is shown in FIG. 3.

Figure 4:
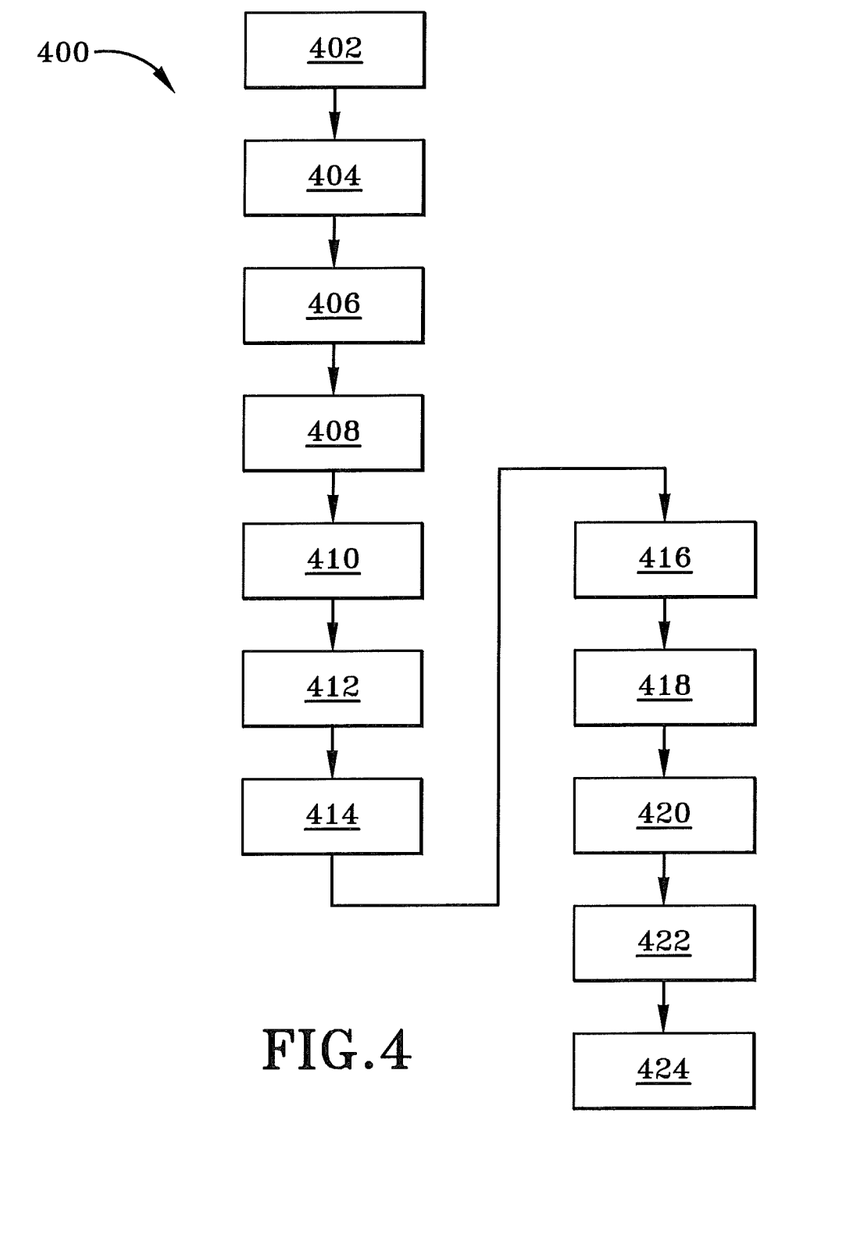
FIG. 4 is an exemplary flow chart for a method for verifying a diopter setting and range of an optical system eyepiece associated with the present disclosure.

FIG. 4 depicts an exemplary flow chart of a method 400 for verifying the diopter setting and range of the optical system eyepiece 20. The method 400 may include providing an image sensor 12 having a lens 17, which is shown generally at 402. The method may also include focusing the lens 17 of the image sensor 12 at infinity, which is shown generally at 404. The method may also include displaying a pattern 26 of spots 28 on a display apparatus of the optical system 19, which is shown generally at 406. The method may also include setting the diopter setting to zero, which is shown generally at 408. The method may also include creating at least one first image with the image sensor 12 of the pattern 26 of spots 28 displayed on the display apparatus of the system 19 at the zero diopter setting, which is shown generally at 410. The method may also include saving the at least one first image to a non-transitory computer readable storage medium 16, which is shown generally at 412. The method may also include adjusting the diopter setting to a non-zero diopter setting, which is shown generally at 414. The method may also include creating at least one second image with the image sensor 12 of the pattern 26 of spots 28 displayed on the display apparatus of the system 19 at the non-zero diopter setting, which is shown generally at 416. The method may also include saving the at least one second image to the non-transitory computer readable storage medium 16, which is shown generally at 418. The method may also include comparing the at least one first image to the at least one second image, which is shown generally at 420. The method may also include calculating the diopter setting and range based on the comparison of the at least one first image and the at least one second image, which is shown generally at 422. The method may also include verifying the diopter setting and range of the optical system eyepiece 20, which is shown generally at 424.

As depicted in FIG. 1, the diopter setting and range verification system 10 of the present disclosure could be implemented through a computer that would not require a human to manipulate any controls. Rather, the computer 14 having the non-transitory computer readable storage medium 16 with instructions encoded thereon for execution in one or more of the processors 18 could verify the diopter setting and range of the optical system eyepiece 20. The computer implemented diopter setting and range verification system 10 would rely on automated computer technology integrated with logic functions configured to verify the diopter setting and range of the optical system eyepiece 20.

In this example, the computer implemented diopter setting and range verification system 10 for verifying the diopter setting and range of the optical system eyepiece 20 may include: an image sensor 12 having a lens 17; an optical system eyepiece 20, a display apparatus; a focusing device 24; a test pattern 26 having at least two spots 28; and at least one computer 14 having a non-transitory computer readable storage medium 16 in having instructions encoded thereon that, when executed by one or more processors 18, result in the following operations for verifying the diopter setting and range of the optical system eyepiece 20, the operations configured to: (a) display the test pattern 26 of spots 28 on the display apparatus of the optical system 19; (b) create at least one first image with the image sensor 12 of the test pattern 26 of spots 28 displayed on the display apparatus of the optical system 19 at a zero diopter setting; (c) create at least one second image with the image sensor 12 of the test pattern 26 of spots 28 displayed on the display apparatus of the optical system 19 at a non-zero diopter setting; (d) process a calculated diopter setting and a calculated range; and (e) verify an actual diopter setting and an actual range of the optical system eyepiece 20 are within a predetermined range.

In accordance with one aspect of the present disclosure, the predetermined range may be any suitable predetermined range. In one example, the predetermined range may be approximately five percent. In another example, the predetermined range may be approximately two percent.

Further, the one or more processors 18 implementing the instructions from the non-transitory computer readable storage medium 16 may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), or any other suitable portable or fixed electronic device.

Also, the computer 14 (which may be a smartphone) may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various exemplary concepts may be embodied as a non-transitory computer readable storage medium (or multiple non-transitory computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the present disclosure. The various appearances "an embodiment," "one embodiment," "some embodiments," "one particular embodiment," or "other embodiments," or the like, are not necessarily all referring to the same embodiments.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the present disclosure is not limited to the exact details shown or described.

The invention claimed is:

1. A system for verifying a diopter setting and range of an optical system eyepiece comprising:
    an image sensor having at least one lens; and
    a non-transitory computer-readable storage medium having instructions encoded thereon that, when executed by one or more processors, result in the following operations for verifying the diopter setting and range of the optical system eyepiece, the operations configured to:
    display a pattern of spots on a display apparatus of the optical system;
    create at least one first image with the image sensor of the pattern of spots displayed on the display apparatus of the system at a zero diopter setting;
    create at least one second image with the image sensor of the pattern of spots displayed on the display apparatus of the system at a first non-zero diopter setting;
    compare the at least one first image to the at least one second image;
    process a calculated diopter setting and a calculated range; and
    verify an actual diopter setting and an actual range of the optical system eyepiece are within a predetermined range.

2. The system of claim 1, wherein the predetermined range is approximately five percent.

3. The system of claim 1, wherein the predetermined range is approximately two percent.

4. The system of claim 1, further comprising:
    an optical axis extending longitudinally through a center of the lens; and wherein one spot of the pattern of spots is positioned on the optical axis.

5. The system of claim 4, wherein the display apparatus further comprises a field of view; and wherein each of the spots not located on the optical axis are positioned outwardly from the optical axis a distance of at least approximately fifteen percent of the field of view of the display apparatus.

6. The system of claim 1, wherein the pattern of spots includes at least two spots.

7. The system of claim 1, wherein each spot of the pattern of spots is at least five image sensor pixels in diameter.

8. The system of claim 1, wherein a ratio of an instantaneous field of view (IFOV) of the image sensor and the optical system eyepiece is at least 1.8.

9. The system of claim 1, wherein the first non-zero diopter setting is a minimum diopter setting.

10. The system of claim 1, wherein the first non-zero diopter setting is a maximum diopter setting.

11. A method for verifying a diopter setting and range of an optical system eyepiece comprising:
    providing an image sensor having at least one lens;
    displaying a pattern of spots on a display apparatus of the optical system;
    creating at least one first image with the image sensor of the pattern of spots displayed on the display apparatus of the system at a zero diopter setting;
    creating at least one second image with the image sensor of the pattern of spots displayed on the display apparatus of the system at a first non-zero diopter setting;
    comparing the at least one first image to the at least one second image;
    processing a calculated diopter setting and a calculated range; and
    verifying an actual diopter setting and an actual range of the optical system eyepiece are within a predetermined range.

12. The method of claim 11, wherein verifying an actual diopter setting and an actual range of the optical system eyepiece are within a predetermined range further comprises:
    verifying an actual diopter setting and an actual range of the optical system eyepiece are within a range of approximately five percent.

13. The method of claim 11, wherein verifying an actual diopter setting and an actual range of the optical system eyepiece are within a predetermined range further comprises:
    verifying an actual diopter setting and an actual range of the optical system eyepiece are within a range of approximately two percent.

14. The method of claim 11, further comprising:
positioning one spot of the pattern of spots on an optical axis extending longitudinally through a center of the lens.

15. The method of claim 14, further comprising:
positioning each of the spots not located on the optical axis outwardly from the optical axis a distance of at least approximately fifteen percent of the field of view of the display apparatus.

16. The method of claim 11, wherein displaying a pattern of spots on a display apparatus of the optical system further comprises:
displaying a pattern of at least two spots on a display apparatus of the optical system.

17. The method of claim 11, wherein displaying a pattern of spots on a display apparatus of the optical system further comprises:
displaying a pattern of spots at least five image sensor pixels in diameter on a display apparatus of the optical system.

18. The method of claim 11, wherein a ratio of an instantaneous field of view (IFOV) of the image sensor and the optical system eyepiece is at least 1.8.

19. The method of claim 11, wherein the first non-zero diopter setting is a minimum diopter setting.

20. The method of claim 11, wherein the first non-zero diopter setting is a maximum diopter setting.

* * * * *